Dec. 31, 1963  H. S. LEE  3,116,070
AIRCRAFT PROPELLER TRAILER
Filed July 23, 1962  2 Sheets-Sheet 1

INVENTOR.
HERBERT S. LEE
BY
ATTORNEY

Dec. 31, 1963 H. S. LEE 3,116,070
AIRCRAFT PROPELLER TRAILER
Filed July 23, 1962 2 Sheets-Sheet 2
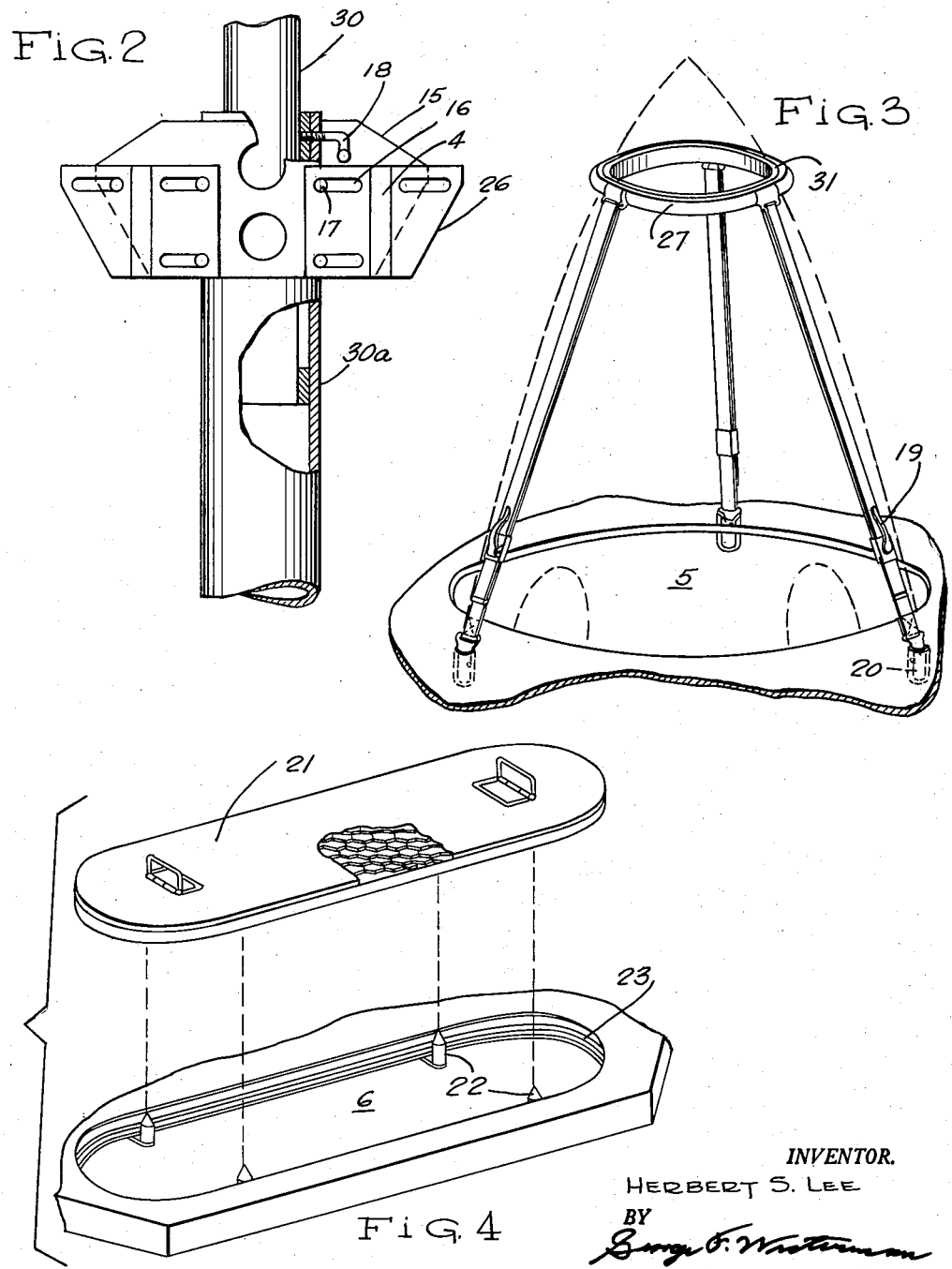
INVENTOR.
HERBERT S. LEE
BY
ATTORNEY

United States Patent Office 3,116,070
Patented Dec. 31, 1963

3,116,070
AIRCRAFT PROPELLER TRAILER
Herbert S. Lee, Los Alamitos, Calif., assignor to the United States of America as represented by the Secretary of the Army
Filed July 23, 1962, Ser. No. 211,921
2 Claims. (Cl. 280—38)

The present invention relates to improvements in transportation, handling and storage means for aircraft propellers.

An object of this invention is to provide an aircraft propeller trailer capable of being towed or hand pushed, and of negotiating unimproved terrain surfaces as well as hard stands.

A further object of this invention is to provide in an aircraft propeller trailer, a lightweight easily converted pallet for aircraft transportability either within the aircraft or as a sling load for external aircraft cargo.

A further object of this invention is to provide an aircraft propeller trailer capable of transporting at least two aircraft propellers of various sizes, so as to protect said aircraft propellers from contact with the ground either on rough terrain or while negotiating an aircraft loading ramp.

Other objects and advantages will be apparent to those skilled in the art upon reference to the following descriptions and the accompanying drawings in which:

FIG. 2 is an elevational view of that section of the propeller mast showing the adjustable V-blocks of FIG. 1;

FIG. 3 is a perspective view of a propeller spinner tie down device utilized in conjunction with the structure of FIG. 1; and FIG. 4 is a perspective view of a closed tool storage area utilized in conjunction with the structure of FIG. 1.

Figure 1:
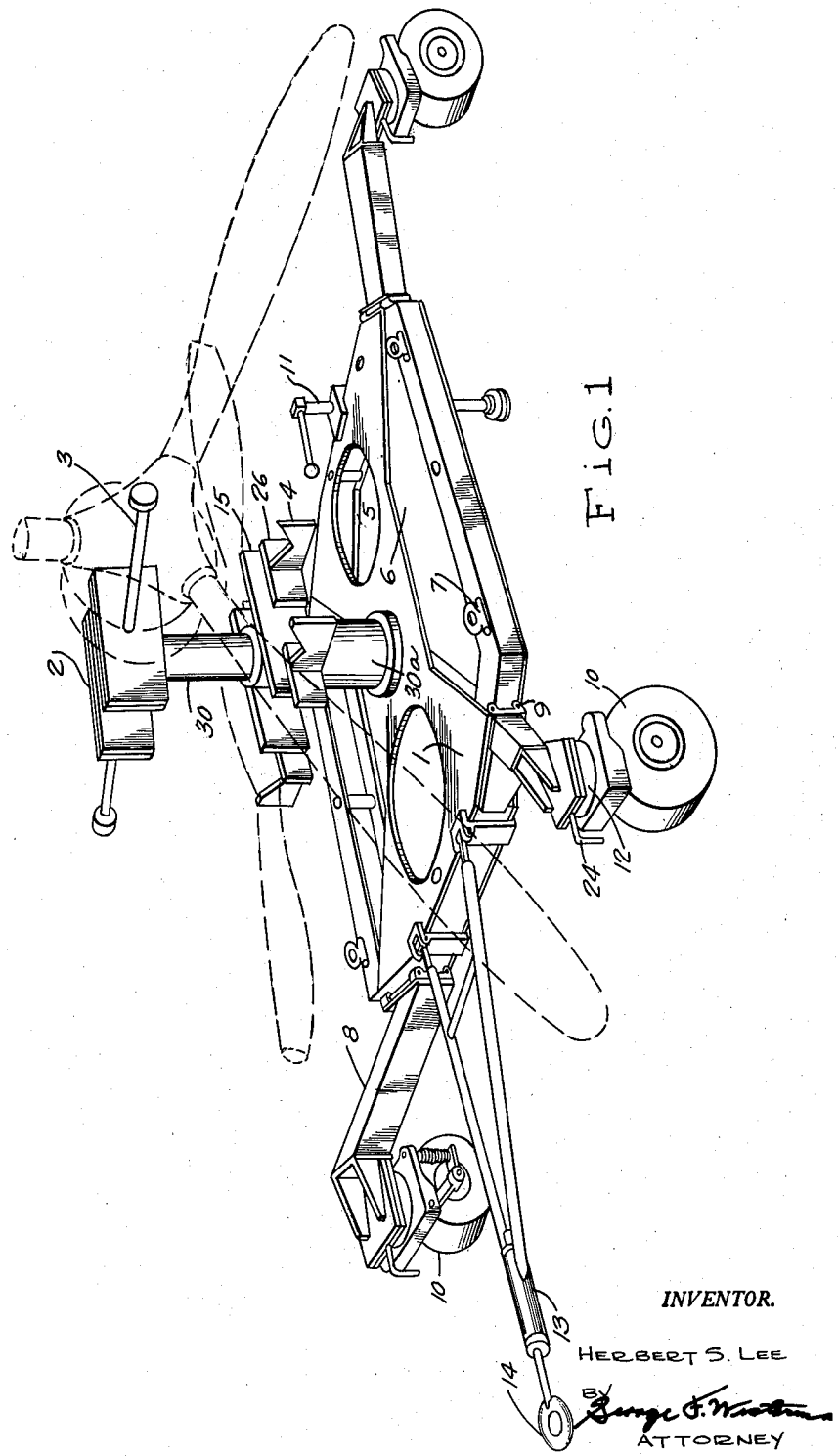
FIG. 1 is a perspective view of the preferred embodiment of the invention.

Briefly, the invention comprises a pallet portion of box girder construction with a telescoping propeller mast supporting a propeller arbor and adjustable cradle-type support blocks mounted substantially at the center of the said pallet portion. Wheels are mounted on folding caster arms extending outwardly and horizontally from the pallet to provide a low center of gravity and great stability. For aircraft loading, or for storage, the wheel assemblies can be folded up over the top of the pallet.

Referring in detail to FIG. 1, pallet portion 1 is of box girder construction and generally of rectangular shape. The four corners of pallet portion 1 are angled so as to accommodate attachments for wheel assembly arms 8 extending horizontally and at an angle with adjacent sides of the pallet of approximately 135 degrees. These attachments are hinge mounted at the top and secured at the bottom by a ball lock pin 9, in such a manner that by disengaging ball lock pin 9 the wheel assembly arms 8 can be folded over the pallet structure to a position of rest on the top thereof. At the end of wheel assembly arms 8 are caster mounted wheels 10 which may be locked in place by swivel lock 24 on caster assembly 12. Substantially at the center of pallet portion 1 is a vertical propeller telescoping mast comprising telescoping portion 30 and sleeve 30a, provided with propeller arbor 3 at the top and adjustable V-blocks 4. The adjustable V-blocks 4 can be utilized for supporting two-blade propellers as shown in FIG. 1 and/or as supports for the downwardly extending blades of three-blade propellers.

The pallet portion 1, being of box construction, is provided with accessory storage area 5 which can also be used for a propeller spinner (FIG. 3), and tool storage area 6. Tie down fittings 7 may be attached to the top or bottom surface of the box structure, or may be removed altogether when utilizing the structure for purposes other than transporting of aircraft propellers. Jack 11 may be placed at any convenient point along the periphery of pallet portion 1 and may be utilized to assist in the folding of wheel assemblies or for maintenance purposes. At the position at or near where jack 11 is shown mounted, a pintle hook may also be attached when it is desired to utilize this device as one unit in a train. Also attached to pallet portion 1 is tow bar 13, of conventional design, along with lunnette 14 which is rotatable within the draw bar.

FIG. 2 shows in detail the adjustable V-blocks 4 and their supporting structure. Secured to the mast sleeve 30a of the mast structure, one on each side, are blade support bases 15 to which blocks 26 are bolted by bolts 17 through slots 16. This allows longitudinal adjustment of the V-blocks individually. Also shown in this drawing is mast clamp 18 which is a conventional screw type clamp designed to hold the telescoping portion 30 of the telescope mast 2 in rigid vertical adjustment, within mast sleeve 30a.

FIGS. 3 and 4 illustrate optional modifications or adaptations for pallet portion 1. FIG. 3 shows a convenient method of securing a propeller spinner over the accessory storage area 5. Straps 31, connected to a flexible ring 27, are adjusted over the spinner and secured at toggle clamps 19, the ends of the straps being secured to the cover of pallet portion 1 by conventional ball lock pin fittings 20.

FIG. 4 shows a closed storage space cover which requires a modification of the access or top portion of the tool storage area 6 to fit a removable cover 21 which fits over fasteners 22 against gasket 23.

I claim:

1. A vehicle for transporting aircraft propellers comprising a flat pallet of substantially rectangular shape and of rigid construction, hinged components secured to said pallet one at each corner thereof, wheel carrying arms hingedly secured each at one end to corresponding hinge components and projecting from said pallet in mutually divergent relationship, means carried by said hinge components for locking said arms in position to extend outwardly from the corresponding corners of said pallet and to free said arms to fold upwardly over said pallet, caster wheel bracket assemblies carried one at the outer end of each of said arms, vehicle wheels carried one by each of said bracket assemblies, a mast secured at one end to said pallet substantially centrally thereof and projecting substantially perpendicularly from the top surface of said pallet, said mast comprising a sleeve secured to said pallet and a stem slidably received in said sleeve for vertical adjustment relative to said pallet, manually actuated means releasably locking said stem in adjusted position relative to said sleeve, a propeller carrying arbor extending transversely of said stem at the upper end thereof and adapted to support two propellers, one at each side of said mast, propeller blade supporting bases mounted on said mast one under each end of said arbor for engaging the edges of propeller blades and firmly supporting the propellers in position on said mast, means securing said bases on said mast for vertical and horizontal adjustment of said bases to engage the blades of propellers of of different sizes, and a towing tongue connected to one end of said pallet for connecting the propeller carrying vehicle to a towing vehicle.

2. A vehicle as set forth in claim 1 wherein said pallet comprises a rigid marginal frame and a cover plate secured to said frame and provided with openings to accommodate items such as propeller hub spinners and tools.

References Cited in the file of this patent

UNITED STATES PATENTS

| | | |
|---|---|---|
| 2,375,363 | Hokanson | May 8, 1945 |
| 2,395,411 | Kittel | Feb. 26, 1946 |
| 2,446,518 | Arnold et al. | Aug. 10, 1948 |
| 2,864,625 | Clements | Dec. 16, 1958 |

FOREIGN PATENTS

| | | |
|---|---|---|
| 767,411 | Great Britain | Feb. 6, 1957 |